(12) United States Patent
Afgani

(10) Patent No.: US 11,190,275 B2
(45) Date of Patent: Nov. 30, 2021

(54) OPTICAL WIRELESS COMMUNICATION SYSTEM AND METHOD

(71) Applicant: PURELIFI LIMITED, Edinburgh (GB)

(72) Inventor: Mostafa Afgani, Edinburgh (GB)

(73) Assignee: PURELIFI LIMITED, Edinburgh (GB)

( * ) Notice: Subject to any disclaimer, the term of this patent is extended or adjusted under 35 U.S.C. 154(b) by 26 days.

(21) Appl. No.: 16/626,680

(22) PCT Filed: Jun. 29, 2018

(86) PCT No.: PCT/GB2018/051829
§ 371 (c)(1),
(2) Date: Dec. 26, 2019

(87) PCT Pub. No.: WO2019/002884
PCT Pub. Date: Jan. 3, 2019

(65) Prior Publication Data
US 2021/0203419 A1 Jul. 1, 2021

(30) Foreign Application Priority Data
Jun. 30, 2017 (GB) ..................... 1710545

(51) Int. Cl.
*H04B 10/54* (2013.01)
*H04B 10/114* (2013.01)
(Continued)

(52) U.S. Cl.
CPC .......... *H04B 10/54* (2013.01); *H04B 10/116* (2013.01); *H04B 10/1149* (2013.01); *H04B 10/506* (2013.01); *H04B 10/60* (2013.01)

(58) Field of Classification Search
CPC .. H04B 10/54; H04B 10/1149; H04B 10/116; H04B 10/506; H04B 10/60
(Continued)

(56) References Cited

U.S. PATENT DOCUMENTS

2006/0056855 A1* 3/2006 Nakagawa ............. H05B 47/19
398/183
2008/0298811 A1* 12/2008 Son ..................... H04B 10/1149
398/172
(Continued)

FOREIGN PATENT DOCUMENTS

CN 105846896 8/2016

OTHER PUBLICATIONS

International Search Report issued in PCT/GB2018/051829 dated Aug. 28, 2018.
(Continued)

*Primary Examiner* — Dalzid E Singh
(74) *Attorney, Agent, or Firm* — Snell & Wilmer L.L.P.

(57) ABSTRACT

An optical wireless communication system comprising a transmitter apparatus that comprises: an illumination light source configured to output visible light for illumination purposes, and a controller configured to control operation of the illumination light source to produce modulation of the visible light to provide an optical wireless communication signal representing data; a further light source configured to output further light, wherein the controller is configured to control operation of the further light source to produce modulation of the further light to provide a further optical wireless communication signal representing substantially the same data, wherein the visible light and the further light have different wavelengths.

22 Claims, 9 Drawing Sheets

(51) Int. Cl.
     *H04B 10/116*      (2013.01)
     *H04B 10/50*       (2013.01)
     *H04B 10/60*       (2013.01)

(58) Field of Classification Search
     USPC .......................................................... 398/186
     See application file for complete search history.

(56) References Cited

U.S. PATENT DOCUMENTS

| | | | |
|---|---|---|---|
| 2008/0310850 A1* | 12/2008 | Pederson | G07C 9/37 398/135 |
| 2009/0208221 A1* | 8/2009 | Sasai | H04B 10/116 398/130 |
| 2009/0324248 A1 | 12/2009 | Shiraki | |
| 2018/0069628 A1* | 3/2018 | Wei | H05B 47/195 |

OTHER PUBLICATIONS

Written Opinion issued in PCT/GB2018/051829 dated Aug. 28, 2018.
Lee et al., "MIMO-VLC Scheme for Scalable Data Rate Transmission," vol. 802.157, Sep. 22, 2009, pp. 1-12, XP017666443.
WIPO; International Preliminary Report on Patentability dated Jan. 9, 2020 in Application No. PCT/GB2018/051829.
European Patent Office, European Office Action dated Jan. 29, 2021 in Application No. 18740636.8.

\* cited by examiner

OPTICAL WIRELESS COMMUNICATION SYSTEM AND METHOD

CROSS-REFERENCE TO RELATED APPLICATIONS

This application is a national stage application of PCT/GB2018/051829, filed on Jun. 29, 2018, which claims priority to GB Application No. 1710545.3, filed on Jun. 30, 2017, which are hereby incorporated by reference in their entirety for all purposes.

FIELD

The present invention relates to an optical wireless communication system and method.

BACKGROUND

It is known to provide wireless data communications by using light instead of radio frequencies to transmit and receive data wirelessly between devices. Data may be transmitted using light by modulating an intensity of the light. The light used may be coherent or incoherent. Methods that use light to transmit data wirelessly may be referred to as optical wireless communications (OWC) or light communications (LC).

Wireless networks using visible light may in some circumstances allow a higher data capacity and greater energy efficiency than radio frequency wireless networks, and may also be used to replace point-to-point infrastructure in locations where conventional infrastructure does not exist or is too expensive to build.

Optical wireless communication may provide simultaneous wireless communication and illumination from luminaires (for example, LED luminaires) that may traditionally only be utilised for lighting. Wireless communication is provided by means of an information bearing optical signal generated by a luminaire. The optical signal has rapid changes in luminosity levels.

An example of variation in luminosity of an optical wireless communication signal is shown in FIG. 1. In the example of FIG. 1, an optical wireless communication signal 1 varies between an upper value of luminosity 2 and a lower value of luminosity 3. The variations in luminosity are rapid, for example the luminosity may vary from the upper value to the lower value millions of times per second. The human eye may not be able to resolve such rapid variations in luminosity. Therefore, these rapid variations may typically be invisible to the human eye. Instead of perceiving rapid variations, the human eye may perceive a longer term average luminosity 4, which is an average luminosity value as measured over a relatively longer timescale than that of the rapid variations.

An OWC signal may be transmitted from a luminaire (for example, a luminaire that is part of an overhead lighting system) and received by a receiver (for example, a receiver that forms part of a user device).

Signal quality of a received optical wireless communication signal at the receiver may be directly proportional to the peak-to-peak amplitude of the signal swing of the transmitted signal. A larger difference between the upper level of luminosity 2 and the lower level of luminosity 3 may provide a higher signal quality. From a communication perspective, it may be considered beneficial to operate the transmitting luminaire at a higher average luminosity level to allow for a larger signal swing, at least up to near the maximum luminosity level of the transmitting luminaire. Near the maximum luminosity level of the transmitting luminaire the signal swing may again reduce.

Conversely, dimming the luminaire to achieve lower illumination levels (a lower average luminosity level) may have a negative impact on the quality of a communication link. In the extreme case where no perceptible illumination is desired, the luminaire may be operated at a very low dimming level or turned off.

An optical wireless communication signal 5 generated to have a low average value of luminosity 6 is shown in FIG. 2.

A highly sensitive detector may be required to receive a low luminosity level signal such as the signal of FIG. 2, where the luminaire is dimmed to a very low level rather than turned off completely. Using a highly sensitive detector in a low-level environment may result in a number of issues. For example, the luminaire response may be likely to be significantly non-linear in such low current or brightness settings, which may distort the generated signal and therefore further reduce the link quality. A highly sensitive detector may be likely to saturate under nominal brightness settings. A secondary detector (or some form of optical gain control) at the user device that is receiving the signal may be required to enable communication across the entire range of brightness settings.

If the luminaire is turned off, optical wireless communication may not be possible.

SUMMARY

According to a first aspect, there is provided an optical wireless communication system comprising a transmitter apparatus that comprises: an illumination light source configured to output visible light for illumination purposes, and a controller configured to control operation of the illumination light source to produce modulation of the visible light to provide an optical wireless communication signal representing data; a further light source configured to output further light, wherein the controller is configured to control operation of the further light source to produce modulation of the further light to provide a further optical wireless communication signal representing substantially the same data, wherein the visible light and the further light have different wavelengths.

By modulating a further light source in addition to the illumination light source, the optical wireless system may continue to work even when the illumination light source is turned off or dimmed to very low levels. In some circumstances, transmitting data on two different channels using the visible light and the further light may improve signal level and/or link quality.

The visible light and the further light may have different wavelength ranges. The visible light and the further light may have non-overlapping wavelength ranges.

The illumination light source may comprise a dimmable illumination light source.

The controller may be configured to control an intensity of the further light. The controller may be configured to control an intensity of the further light in dependence on an intensity and/or dimming level of the visible light. The controller may increase an intensity of the further light in response to a decrease in an intensity of the visible light. The controller may thereby compensate for dimming of the visible light by increasing the further light.

The further light output by the further light source may be light that is invisible to the human eye. The use of light that is invisible to the human eye may allow transmission of data when it is desired that visible lighting should be turned off or reduced in intensity.

The further light output by the further light source may comprise infrared or ultraviolet light.

The visible light may have a wavelength between 400 nm and 700 nm. The further light may have a wavelength below 400 nm. The further light may have a wavelength above 700 nm.

The further light may have a wavelength between 700 nm and 1 mm. The further light may have a wavelength between 1 nm and 400 nm.

The controller may control the illumination light source and the further light source such that the illumination light source and the further light source transmit said data at substantially the same time.

The controller may control the illumination light source and the further light source such that the illumination light source transmits the data as a first data stream and the further light source transmits the data as a second data stream. The first data stream and second data stream may be transmitted substantially simultaneously. The beginning and/or end of the first and second data streams may occur at substantially the same time. The first and second data streams may be substantially the same.

The illumination light source and the further light source may have substantially the same field of view. The illumination light source and the further light source may have substantially the same coverage area.

The system may comprise a luminaire. The illumination light source and the further light source may form part of said luminaire.

The illumination light source may form part of a luminaire. The further light source may form part of a further component, separate from the luminaire. The further component may comprise an access point. The further component may comprise the controller. The system may further comprise a receiver apparatus for receiving the visible light and the further light. The receiver apparatus may comprise at least one demodulator for demodulating the optical wireless communication signals from the visible light and the further light.

The receiver apparatus may comprise at least one sensor for sensing each of the visible light and the further light to produce respective sensor signals. The receiver apparatus may be configured to combine the sensor signals to obtain a combined signal.

The receiver apparatus may comprise at least one sensor. The same sensor may be used for sensing both the visible light and the further light.

The at least one sensor may sense the visible light to produce a first sensor signal. The at least one sensor may sense the further light to produce a second sensor signal. The receiver apparatus may further comprise a selector configured to select one or both of the first sensor signal and the second sensor signal. The receiver apparatus may be configured to extract data from the selected signal(s). The selector may be configured to apply relative weightings to the first sensor signal and the second sensor signal. The selector may be configured to select the first sensor signal and/or second sensor signal based on at least one of: signal strength, signal to noise ratio. The selector may be configured to apply weightings to the first sensor signal and the second sensor signal based on at least one of: signal strength, signal to noise ratio. The selector may be configured to apply the weightings in the analog domain.

The receiver apparatus may comprise a filter configured to at least partially block light having at least some wavelengths other than the wavelengths of the visible light and the further light.

The filter may be configured to block light having at least some wavelengths between the wavelength(s) of the visible light and the wavelength(s) of the further light.

The controller may be configured to provide the modulation of the visible light and/or the further light at a modulation frequency between 1 Hz and 10 THz, optionally between 1 kHz and 100 GHz, further optionally between 100 kHz and 10 GHz. The illumination light source may comprise at least one of: a light-emitting diode (LED), a laser, a laser diode, a light-emitting plasma (LEP). The further light source may comprise at least one of: a light-emitting diode (LED), a laser, a laser diode, a light-emitting plasma (LEP).

According to a second aspect, there is provided an optical wireless communication transmitter apparatus that comprises: an illumination light source configured to output visible light for illumination purposes; a controller configured to control operation of the dimmable illumination light source to produce modulation of the visible light to provide an optical wireless communication signal representing data; and a further light source configured to output further light, wherein the controller is configured to control operation of the further light source to produce modulation of the further light to provide a further optical wireless communication signal representing substantially the same data, wherein the visible light and the further light have different wavelengths.

According to a third aspect, there is provided an optical wireless communication receiver apparatus that comprises: at least one sensor for sensing each of received visible light and received further light to produce at least one sensor signal, wherein the visible light and the further light have different wavelengths and are each modulated to provide respective optical wireless communication signals, and the optical wireless communication signals represent substantially the same data; and demodulation circuitry and a processing resource for performing a demodulation and processing with respect to the at least one sensor signal to obtain said data.

According to a fourth aspect, there is provided a method of transmitting data using optical wireless communication comprising: controlling operation of an illumination light source configured to output visible light for illumination purposes, to produce modulation of the visible light to provide an optical wireless communication signal representing data; and controlling operation of a further light source configured to output further light, to produce modulation of the further light to provide a further optical wireless communication signal representing substantially the same data, wherein the visible light and the further light have different wavelengths.

According to a fifth aspect, there is provided a method of receiving data using optical wireless communication comprising: sensing each of received visible light and received further light to produce at least one sensor signal, wherein the visible light and the further light have different wavelengths and are each modulated to provide respective optical wireless communication signals, and the optical wireless communication signals represent substantially the same data; and performing a demodulation process with respect to the at least one sensor signal to obtain said data.

According to any of the aspects, the transmitter apparatus and/or the receiver apparatus may be included in, or comprise or be associated with an access point. The access point may comprise any suitable apparatus that enables data to be transferred from one network to another network and/or from one transmission medium to another transmission medium. For example, the access point may provide for transfer of data from LiFi or other OWC transmission mechanism to a Wi-Fi™ other radio frequency (RF) transmission mechanism, or vice versa. Alternatively or additionally the access point may be provide for transfer of data from a wired transmission mechanism to a LiFi or other OWC transmission mechanism, or vice versa. The access point may enable a LiFi or other OWC device to connect to a wired network or Wi-Fi network or other RF network.

Features in one aspect may be applied as features in any other aspect in any suitable combination. For example, device features may be applied as method features and vice versa.

BRIEF DESCRIPTION OF THE DRAWINGS

Various aspects of the invention will now be described by way of example only, and with reference to the accompanying drawings, of which.

DETAILED DESCRIPTION OF THE DRAWINGS

The term light as used herein may refer to electromagnetic waves with wavelengths in a range 1 nm to 1 mm. Light may include ultraviolet, visible and near-infrared electromagnetic radiation.

Figure 1:
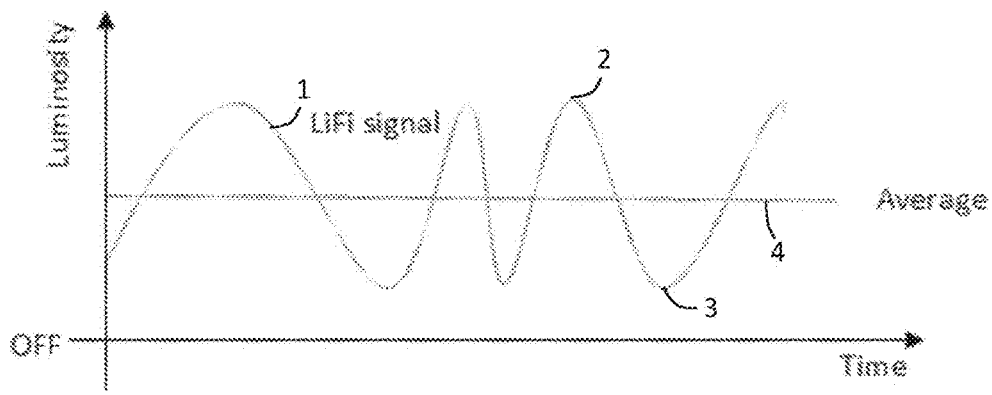
FIG. 1 is a plot of luminosity versus time.
Figure 2:
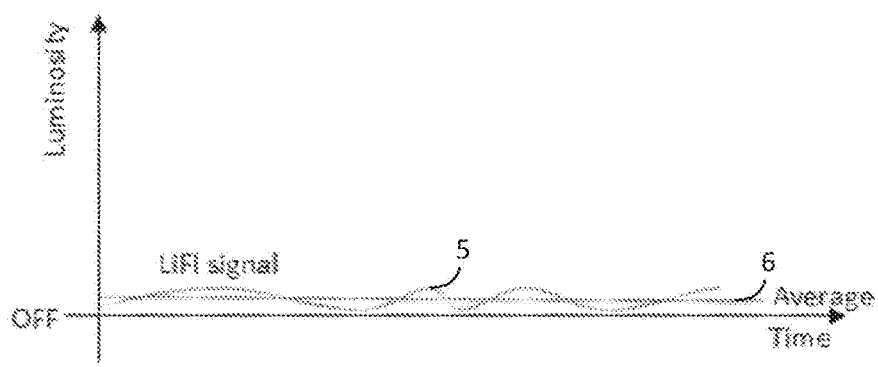
FIG. 2 is a plot of luminosity versus time.
Figure 3:
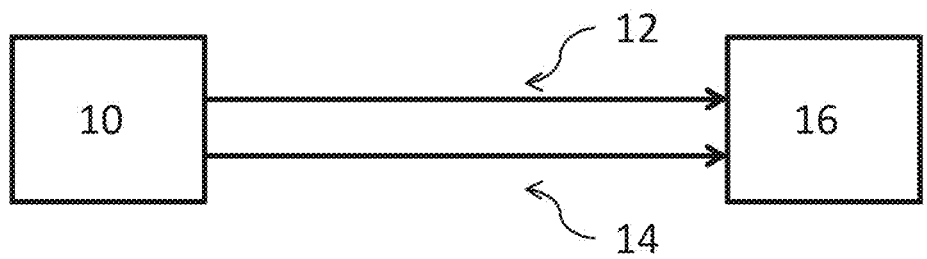
FIG. 3 is a schematic diagram of an optical wireless communication system.

FIG. 3 is a schematic block diagram illustrating an optical wireless communication system. A transmitter apparatus 10 is configured to send a wireless optical signal in which information is encoded. The transmitter apparatus 10 is configured to send the wireless optical signal through a first optical communication channel 12 and through a second optical communication channel 14 to a receiver 16. The optical communication channels 12, 14 may be free-space communication channels. Each of the optical communication channels has a characteristic optical wavelength. The characteristic optical wavelength of the second optical communication channel 14 is different to the characteristic optical wavelength of the first optical communication channel 12.

The transmitter apparatus 10 may in some embodiments comprise an OWC communication device. The transmitter apparatus 10 may support a bi-directional communication protocol. The transmitter apparatus 10 may support any suitable communication protocol, for example IEEE 802.15.7, 802.15.13, 802.11 or extensions or developments thereof.

In the present embodiment, the transmitter apparatus 10 comprises or forms part of a dimmable luminaire, which is part of an overhead lighting system. The receiver apparatus 16 forms part of a user device, for example a mobile device or dongle. The optical communication channels 12, 14 are downlink channels that are used to send information from the luminaire to the mobile device. In other embodiments the transmitter apparatus 10 and receiver apparatus 16 may each comprise or form part of any suitable device, for example any device configured to transmit and/or receive OWC data.

Figure 4:
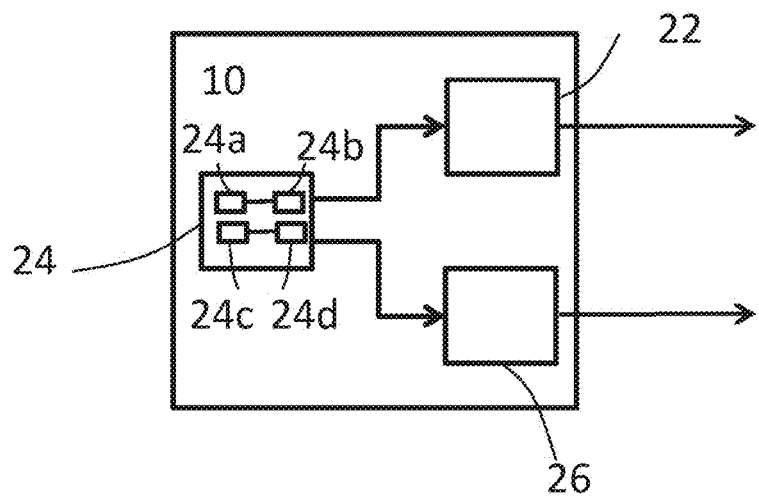
FIG. 4 is a schematic diagram of an optical wireless transmitter apparatus.

FIG. 4 is a schematic diagram of a transmitter apparatus 10 according to embodiments. The transmitter apparatus 10 includes a first light emitting diode (LED) 22 or other suitable light source, a second LED 26 or other suitable light source, and a controller 24 to control the first and second LEDs 22, 26. The controller 24 comprises circuitry (not shown) to drive the first and second LEDs 22, 26 to produce optical signals.

For simplicity, each of the first LED 22 and second LED 26 is described as a single LED. However, in practice, first LED 22 and second LED 26 may be replaced by a first and second light source each comprising a plurality of LEDs or other light sources. First and second LEDs 22, 26 may be supplemented or replaced by any suitable light sources, for example lasers, laser diodes, or LEPs (light-emitting plasma).

The first LED 22 produces light having a first wavelength that is in the visible light spectrum. The visible light spectrum may include wavelengths in the range of about 400 to 700 nm. Since the light produced by the first LED 22 is part of the visible light spectrum, the first LED 22 provides light that may be used for the purposes of illumination.

The second LED 26 produces light having a second wavelength that is outside the visible light spectrum. For example, the second LED may produce light in the infrared spectrum (for example, between about 700 nm to 1 mm) or the ultraviolet spectrum (for example, between about 1 nm to 400 nm).

The transmitter apparatus 10 therefore produces visible light from the first LED 22 and non-visible light from the second LED 26. The visible light from the first LED 22 provides the first optical communication channel 12 as shown in FIG. 3. The non-visible light from the second LED 26 provides the second optical communication channel 14.

Turning to the controller 24 in more detail, the circuitry of the controller 24 includes first driving circuitry associated with the first LED 22 to drive the first LED 22 to produce a first optical signal. The first driving circuitry includes a first digital to analogue convertor (not shown) configured to provide a first modulation signal at a frequency characteristic of an optical light communication signal. The frequency of modulation may be, for example, between 100 kHz and 10 GHz.

A first processor 24a modulates data onto a drive current and the first driving circuitry 24b provides the drive current to the first LED 22. The first LED 22 then produces a first outgoing modulated optical wireless communication signal that carries the data. The first LED 22 transmits the data as a first data stream.

In addition to modulating the drive current to encode the data, the controller 24 controls an average illumination level of the first LED 22. The controller 24 is configured to vary an average intensity of the first LED 22 to vary a level of illumination provided by the first LED 22. The first LED 22 may be described as dimmable.

The circuitry of the controller 24 includes second driving circuitry 24d associated with the second LED 26 to drive the second LED 26 to produce a second optical signal. The second driving circuitry 24*d* includes a second digital to analogue convertor (not shown) configured to provide a second modulation signal at a frequency characteristic of an optical light communication signal (which may be the same modulation frequency as that of the first modulation signal).

A second processor 24*c* modulates data onto a drive current and the second driving circuitry 24*d* provides the drive current to the second LED 26. The second LED 26 then produces a second outgoing modulated optical wireless communication signal that carries the data. The second LED 26 provides data as a second data stream.

The controller 24 may also control an average intensity provided by the second LED 22.

In the present embodiment, the two LEDs 22, 26 are driven by separate circuitry comprising respective driving circuitry 24*b*, 24*d*, a respective digital to analogue converter and a respective processor 24*a*, 24*c*. In other embodiments, some or all of the circuitry of the controller may be shared between the two LEDs 22, 26. For example, a single processor may modulate the data onto drive currents that drive the first LED 22 and second LED 26.

Any appropriate modulation scheme may be used by the controller 24 to modulate the data onto the drive currents. For example, the current may be modulated using at least one of on-off keying, quadrature amplitude modulation, phase shift keying, orthogonal frequency division multiplex, amplitude modulation, or frequency modulation.

In the present embodiment, the same data is carried on the first and second outgoing modulated OWC signals. The first data stream from the first LED 22 and the second data stream from the second LED 26 are substantially the same, and are transmitted substantially simultaneously. In other embodiments, different data may be carried on the first and second outgoing modulated OWC signals. In further embodiments, the same data may be carried on the first and second outgoing modulated OWC signals, but the data may be differently encoded and/or transmitted at different times.

The second, non-visible OWC signal continues to be transmitted even when the first, visible LED 22 is dimmed to a low level or is switched off. The non-visible LED 26 may provide a secondary channel 14 that supplements a primary channel 12 provided by the visible LED 22.

In the present embodiment, the controller 24 is configured to control an average intensity level of the second LED 26 in dependence on the illumination level of the first LED 22. The controller 24 increases the output level of the second LED 26 if the output level of the first LED 22 is decreased. The increasing of the output level of the second LED 26 may be such as to compensate for dimming of the first LED 22.

In further embodiments, the second, non-visible LED 26 operates at a substantially constant output level that does not depend on the illumination level of the first, visible LED 22.

Figure 5:
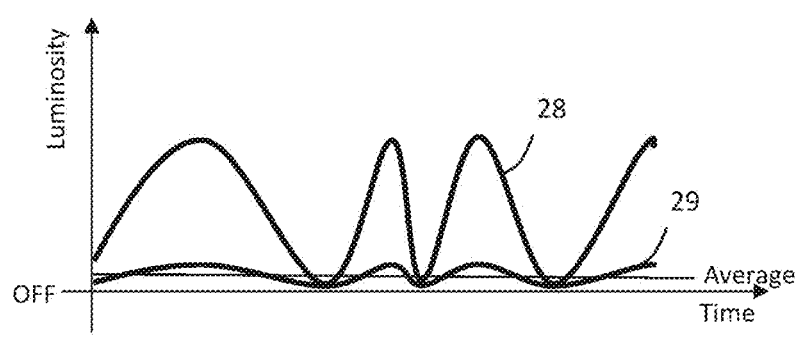
FIG. 5 is a plot of luminosity versus time for first and second light sources.

FIG. 5 shows a plot of luminosity versus time in which the luminosity 28 of the second LED 26 is greater than the luminosity 29 of the first LED 22. The second LED 26 provides a secondary non-visible optical link to maintain communication when the luminaire is dimmed.

Figure 6:
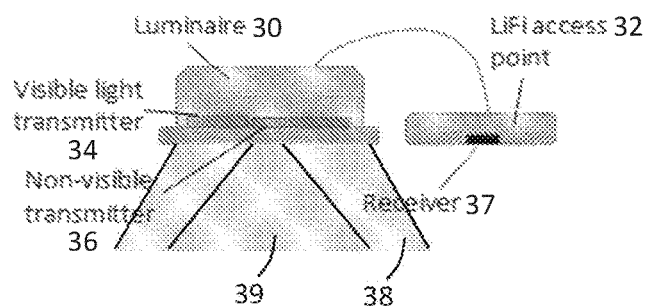
FIG. 6 is a schematic diagram of an optical wireless transmitter apparatus.
Figure 7:
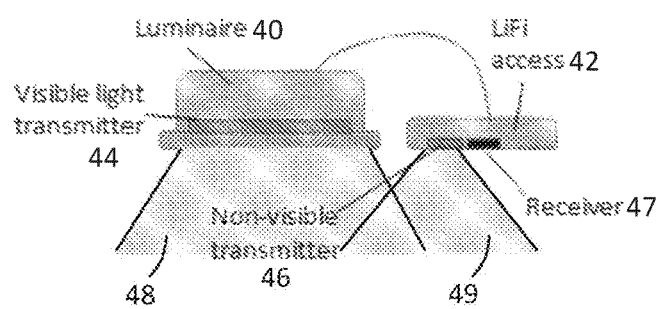
FIG. 7 is a schematic diagram of an optical wireless transmitter apparatus.

Specific configurations of a transmitter apparatus are now described with reference to FIGS. 6 and 7. In FIGS. 6 and 7, the transmitter apparatus is a transceiver apparatus that is configured to transmit and to receive OWC data.

FIG. 6 is a schematic diagram of a transmitter apparatus comprising a luminaire 30 and an associated access point 32. The luminaire 30 and access point 32 are positioned side-by-side. For example the luminaire 30 and access point 32 may be mounted side-by-side on a ceiling.

The luminaire 30 comprises a visible light transmitter 34 which comprises a source of visible light. The luminaire 30 comprises a non-visible light transmitter which comprises a source of non-visible light. The access point 32 comprises a receiver 37 that is configured to receive OWC signals, for example to receive uplink signals from a user device (not shown).

The access point 32 is configured to receive input data and to encode the input data using a modulation scheme to produce a modulated signal. The modulated signal is used to drive the visible light transmitter 34 to transmit modulated visible light, and to drive the non-visible light transmitter 36 to transmit non-visible modulated light, for example infrared or ultraviolet light.

The visible light transmitter 34 acts as a primary optical transmitter that provides both illumination and OWC communication. The non-visible light transmitter acts as a secondary optical transmitter that operates at a wavelength that is invisible to the human eye. The secondary optical transmitter is incorporated directly into the luminaire 30 alongside conventional illumination devices. The luminaire 30 is a custom luminaire that is configured to include both optical transmitters 34, 36.

FIG. 6 represents a region of visible light 38 transmitted from the visible light transmitter 34, and a region of non-visible light 39 transmitted from the non-visible light transmitter 36.

A coverage area of a transmitter may be an area in which light provided by that transmitter may be received. For example, in the case of overhead lighting, the coverage area may be a floor area in which light provided by a transmitter in a luminaire may be received.

By incorporating the non-visible light transmitter 36 into the luminaire 30 along with the visible light transmitter 34, a coverage area provided by the non-visible light may be similar to a coverage area provided by the visible light. In some embodiments, substantially identical coverage is provided in visible and non-visible wavelengths.

FIG. 7 is a schematic diagram of a further transmitter apparatus comprising a luminaire 40 and an access point 42 which are positioned side-by-side. The luminaire 40 comprises a visible light transmitter 44 which comprises a source of visible light.

The access point 42 comprises a non-visible light transmitter 46 which comprises a source of non-visible light and a receiver 37 that is configured to receive OWC signals, for example to receive uplink signals from a user device (not shown).

The access point 42 is configured to receive input data and to encode the input data using a modulation scheme to obtain a modulated signal. The modulated signal is used to drive the visible light transmitter 44 in the luminaire 40 to transmit modulated visible light, and to drive the non-visible light transmitter 46 in the access point 42 to transmit non-visible modulated light, for example infrared or ultraviolet light.

The configuration of the transmitter apparatus of FIG. 7 may allow use of a luminaire 40 that is not modified to output both visible and non-visible light, for example any luminaire that is capable of being used for OWC communication. The luminaire 40 may be described as an unmodified luminaire. The luminaire 40 may be a luminaire 40 that is designed primarily for illumination purposes, for example a conventional LED luminaire.

FIG. 7 represents a region of visible light 48 transmitted from the visible light transmitter 44, and a region of non-visible light 49 transmitted from the non-visible light transmitter 46.

In the configuration shown in FIG. 7, the areas of coverage provided by the visible light transmitter 44 and non-visible light transmitter 46 may differ since the visible light transmitter 44 and non-visible light transmitter 46 are integrated into different devices and are therefore spatially offset.

Figure 8:
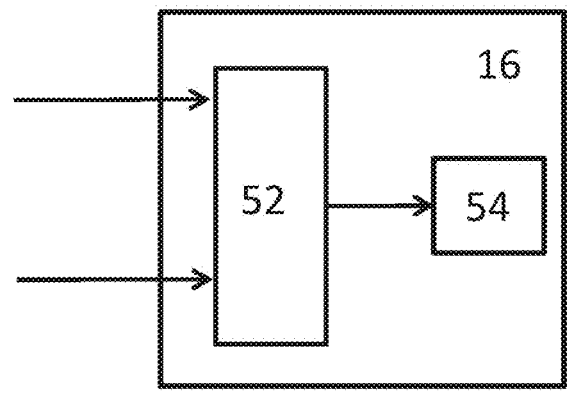
FIG. 8 is a schematic diagram of an optical wireless receiver apparatus.

FIG. 8 is a schematic diagram of a receiver apparatus 16. FIG. 8 represents the receiver apparatus 16 in overview. Several specific arrangements of components of the receiver apparatus 16 are described below with reference to FIGS. 9 to 13.

In the present embodiment, a single receiver apparatus 16 is configured to receive a first modulated OWC signal from the first LED 22 and a second modulated OWC signal from the second LED 26. In further embodiments, the first and second modulated OWC signals may be received by different receiver apparatuses. The receiver apparatus 16 or receiver apparatuses may be integrated into a user device, for example a mobile device or dongle.

The receiver apparatus 16 shown in FIG. 8 includes a light sensing apparatus 52 that includes one or more photodiodes or other suitable light detectors and associated conditioning circuitry to condition any received signals. The light sensing apparatus 52 may also comprise one or more filters. The receiver apparatus 16 also includes a demodulator 54.

The photodiode or photodiodes convert received light to at least one electronic signal which is then conditioned by the conditioning circuitry. Conditioning may include one or more filter steps; amplification of a weak electrical signal; equalisation of received signals; and converting the analogue signals into digital signals using an analogue to digital convertor. The digital signals are then provided to the demodulator 54 to be demodulated to extract communication data. The light sensing apparatus 52 is configured to sense both visible light and non-visible light from the transmitter apparatus 10.

By using a receiver 16 that is configured to sense both visible and non-visible light, the receiver 16 may continue to receive OWC signals even if the visible light is turned off or dimmed to very low levels. Furthermore, OWC signals at the two wavelengths may add constructively at the receiver 16. The constructive adding of the signals at the two wavelengths may improve the signal level and hence the communication link quality.

FIGS. 9 to 13 show different example arrangements of components of a receiver apparatus 16 for receiving visible and non-visible light signals and demodulating the light signals.

Figure 9:
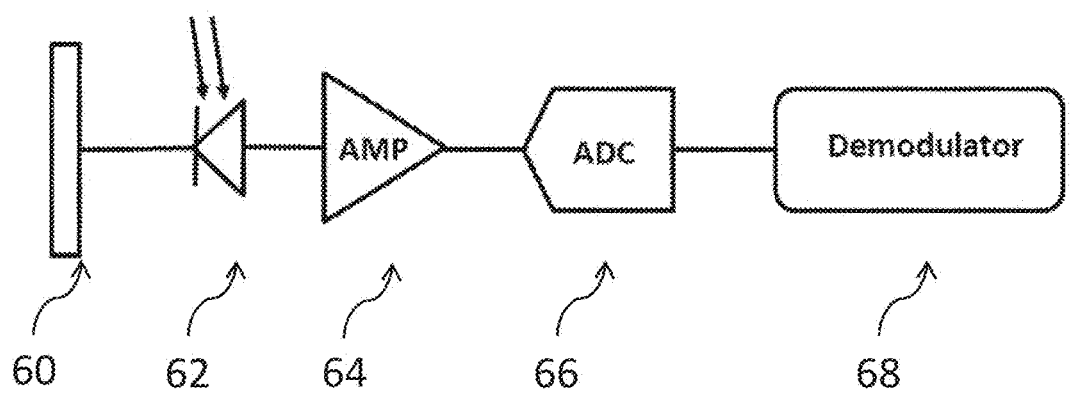
FIGS. 9, 10, 11, 12 and 13 are schematic diagrams each showing components of a respective optical wireless receiver apparatus.

FIG. 9 shows a first example of components of a receiver apparatus. The receiver apparatus comprises a filter 60, a photodiode 62, an amplifier 64, an analogue to digital convertor 66 and a demodulator 68.

Filter 60 is configured to permit light of the first and second wavelength to pass through the filter 60. Filter 60 is configured to at least partially block light of some other wavelengths. For example, filter 60 is configured to block light having wavelengths that are between the first wavelength and the second wavelength.

In operation, visible and non-visible modulated light is received from the transmitter apparatus 10 and is incident on filter 60. Filter 60 blocks light having at least some wavelengths incident on the filter 60. Filter 60 permits light of the first wavelength and light of the second wavelength to pass. Light that passes through filter 60 is then incident on photodiode 62. The photodiode 62 is sensitive to light over a wavelength range that includes the first and second wavelength.

Photodiode 62 converts the received light into an electronic signal. The electronic signal is then passed to amplifier 64 which amplifies the signal. The amplified signal from amplifier 64 is converted to a digital signal by the analogue to digital convertor 66. The digital signal from the analogue to digital converter is provided to the demodulator to be demodulated to extract communication data.

In the embodiment of FIG. 9, the first and second modulated OWC signals are combined at the filter 60. A single receiver is used to receive OWC signals at both frequencies, by using the optical filter 60 that is designed to permit both wavelengths of interest (but reject other wavelengths).

Figure 10:
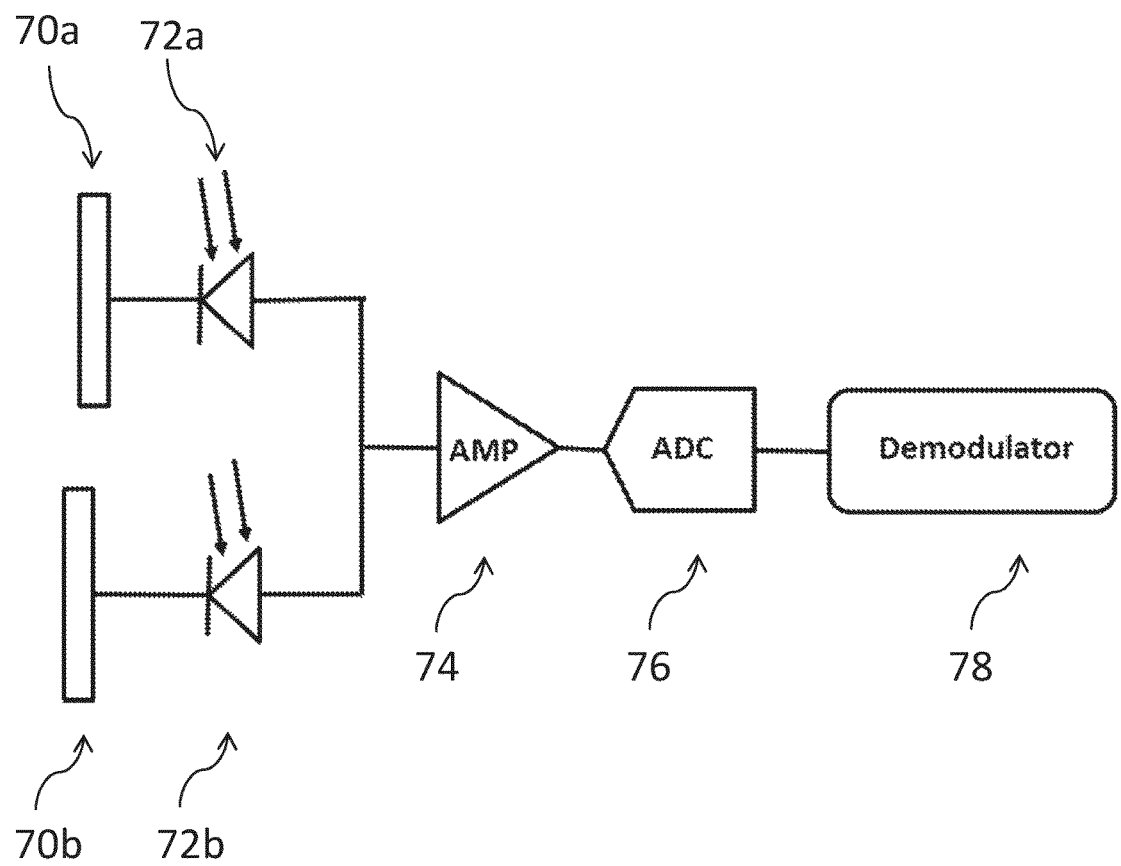

FIG. 10 shows a second example of a receiver apparatus. The receiver apparatus comprises a first filter 70a, a second filter 70b, a first photodiode 72a, a second photodiode 72b, an amplifier 74, an analogue to digital convertor 76 and a demodulator 78.

The first filter 70a is configured to pass light of the first wavelength. The first filter 70a is configured to at least partially block light of some other wavelengths, including the second wavelength. The first photodiode 72a is configured to detect received light of the first wavelength and convert the received light into a first electronic signal.

The second filter 70b is configured to pass light of the second wavelength. The second filter 70b is configured to at least partially block light of some other wavelengths, including the first wavelength. The second photodiode 72b is configured to detect received light of the second wavelength and convert the received light into a second electronic signal.

The first electronic signal and second electronic signal are combined at a single amplifier 74. The amplifier 74 amplifies the combined signal. The amplified signal is converted from analogue to digital by the analogue to digital converter 76. The signal that is output from the analogue to digital converter 76 is demodulated by the demodulator 78.

In the embodiment of FIG. 10, the first and second modulated OWC signals are combined at a single amplifier 74.

Figure 11:
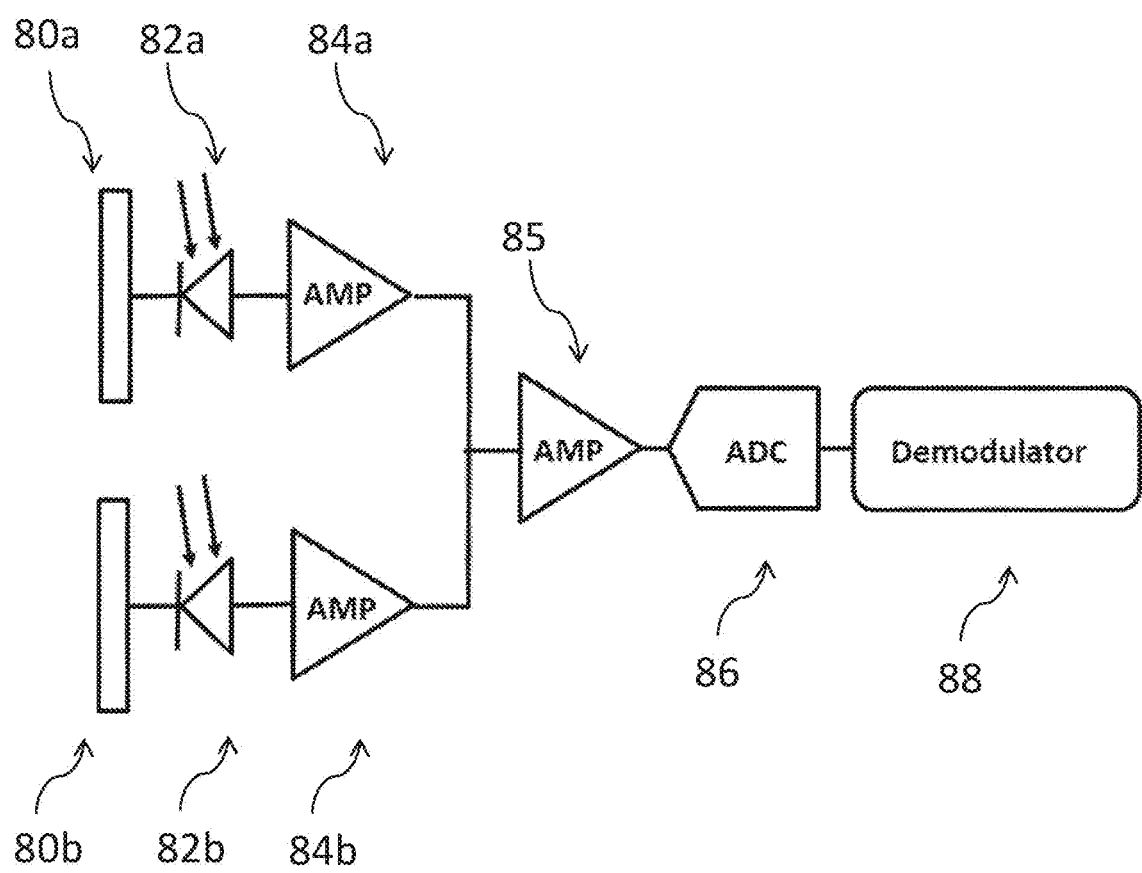

FIG. 11 shows a third example of a receiver apparatus. The receiver apparatus comprises a first filter 80a, a second filter 80b, a first photodiode 82a, a second photodiode 82b, a first amplifier 84a, a second amplifier 84b, a further amplifier 85, an analogue to digital convertor 86 and a demodulator 88.

The first filter 80a, second filter 80b, first photodiode 82a and second photodiode 82b may be similar to the first filter 70a, second filter 70b, first photodiode 72a and second photodiode 72b described above with reference to FIG. 10.

In use, light of the first wavelength is passed by first filter 80a and detected by first photodiode 82a, which outputs a first electronic signal. The first electronic signal is amplified by the first amplifier 84a.

Light of the second wavelength is passed by second filter 80b and detected by second photodiode 82b, which outputs a second electronic signal. The second electronic signal is amplified by the second amplifier 84b.

The first and second amplified signals from the first and second amplifiers 84a, 84b are combined by the further amplifier 85. The signal output by the further amplifier 85 is converted to a digital signal by the analogue to digital converter 86. The digital signal is demodulated by the demodulator 88.

In the embodiment of FIG. 11, the first and second modulated OWC signals are combined at the further amplifier 85.

Figure 12:
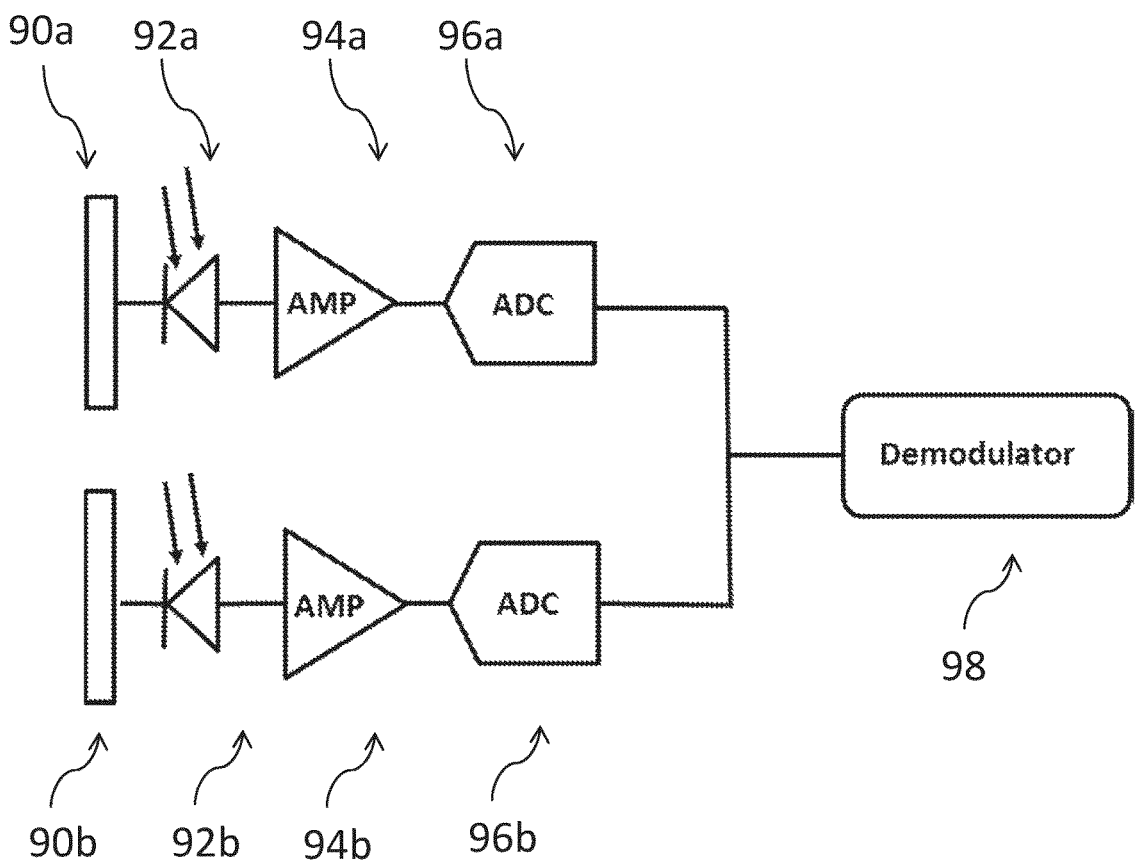

FIG. 12 shows a fourth example of a receiver apparatus. The receiver apparatus comprises a first filter 90a, a second filter 90b, a first photodiode 92a, a second photodiode 92b, a first amplifier 94a, a second amplifier 94b, a first analogue to digital convertor 96a, a second analogue to digital convertor 96b and a demodulator 98.

The first filter 90a, second filter 90b, first photodiode 92a, second photodiode 92b, first amplifier 94a and second amplifier 94b may be similar to the first filter 80a, second filter 80b, first photodiode 82a, second photodiode 82b, first amplifier 84a, and second amplifier 84b described above with reference to FIG. 11.

In use, light of the first wavelength is passed by first filter 90a and detected by first photodiode 92a, which outputs a first electronic signal. The first electronic signal is amplified by the first amplifier 94a and converted to a first digital signal by the first analogue to digital converter 96a.

Light of the second wavelength is passed by second filter 90b and detected by second photodiode 92b, which outputs a second electronic signal. The second electronic signal is amplified by the second amplifier 94b and converted to a second digital signal by the second analogue to digital converter 96b.

The first and second digital signals from the first and second analogue to digital converters 96a, 96b are combined and input to the demodulator 98, which demodulates the combined digital signal. In the embodiment of FIG. 12, the first and second modulated OWC signals are combined when going into the demodulator 98.

Figure 13:
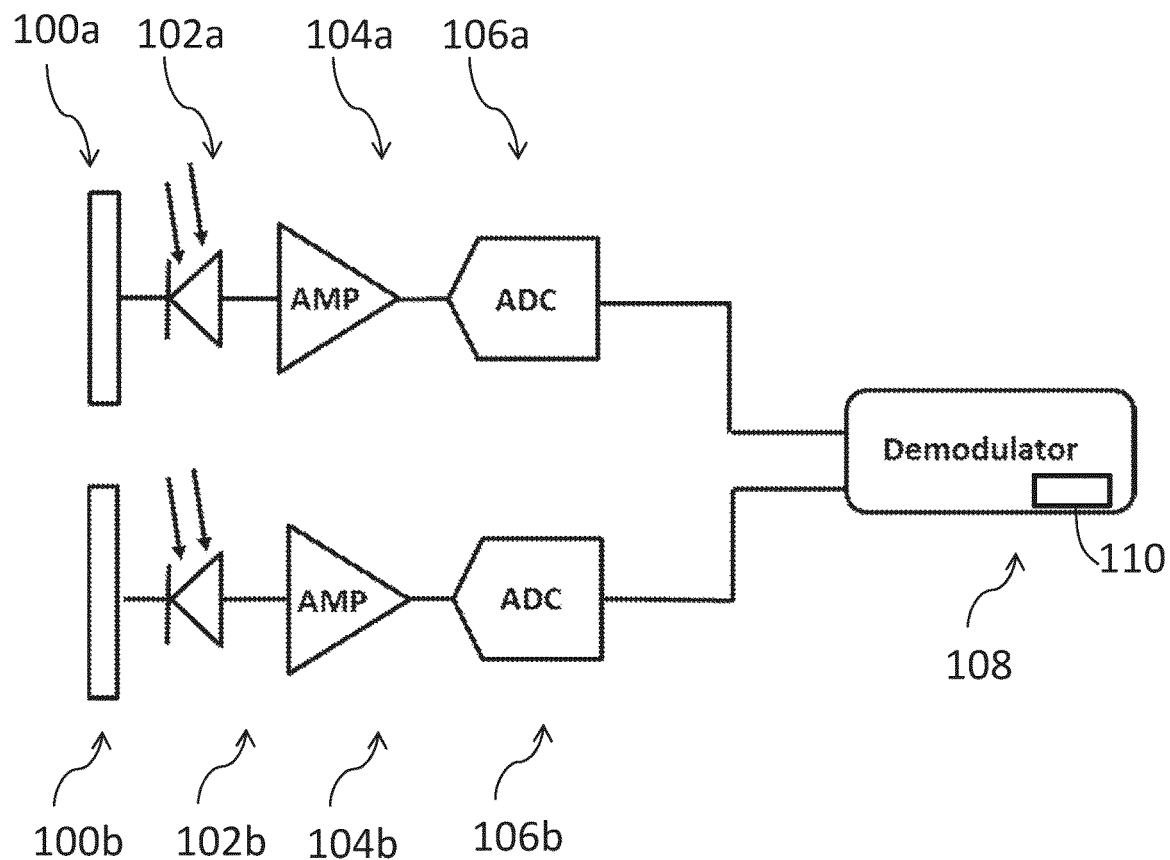

FIG. 13 shows a fifth example of a receiver apparatus. The receiver apparatus comprises a first filter 100a, a second filter 100b, a first photodiode 102a, a second photodiode 102b, a first amplifier 104a, a second amplifier 104b, a first analogue to digital convertor 106a, a second analogue to digital convertor 106b and a demodulator 108.

The first filter 100a, second filter 100b, first photodiode 102a, second photodiode 102b, first amplifier 104a, second amplifier 104b, first analogue to digital convertor 106a, and second analogue to digital convertor 106b may be similar to the first filter 90a, second filter 90b, first photodiode 92a, second photodiode 92b, first amplifier 94a, second amplifier 94b, first analogue to digital convertor 96a, and second analogue to digital convertor 96b of FIG. 12.

The demodulator 108 comprises selection circuitry 110, which may be described as intelligent selection circuitry. The selection circuitry 110 receives data from two different channels. The first channel comprises data from the visible OWC signal provided using the first LED 22. The second channel comprises data from the non-visible OWC signal provided using the second LED 26. The selection circuitry 110 is configured to select one or both of the channels. The selection circuitry 110 may weight one channel relative to the other channel.

The strength of the signal on the first channel may vary in dependence on an illumination level provided by the first LED 22. If the first LED 22 is operating at a high illumination level, the signal on the first channel may be strong. If the first LED 22 is dimmed to produce a lower illumination level, the signal on the first channel may be reduced. If the first LED 22 is turned off, no signal may be present on the first channel received by the demodulator.

In some circumstances, the signal received on the first channel may be higher than the signal received on the second channel if the first LED 22 is operating at a high illumination level. The signal received on the first channel may be lower than the signal received on the second channel if the first LED 22 is operating at a low illumination level.

In some circumstances, the signals received on the first and second channels may vary for reasons that are not associated with the output levels of the LEDs 22, 26. For example, the strength of the signals may depend on the relative positioning of the transmitter apparatus 10 and receiver apparatus 16. The strength of one or both of the signals may be affected by the presence of obstructions between the transmitter apparatus 10 and receiver apparatus 16.

In the present embodiment, the selection circuitry 110 is configured to increase gain on one channel through weighting as the signal on the other channel drops. For example, if the signal on the first channel drops (for example, due to dimming of the first LED), the selection circuitry 110 may increase a weighting of the second channel.

The selection circuitry 110 may link gain on either or both of the channels to signal to noise ratio (SNR). The selection circuitry 110 may assign a higher weighting to the signal having the better SNR.

The selection circuitry 110 may be configured to switch each of the channels on or off based on SNR and/or signal strength. For example, the selection circuitry 110 may turn off the channel having the poorer SNR and/or lower signal strength, and use only the channel having the better SNR and/or higher signal strength.

Although in the embodiment of FIG. 13, the selection circuitry 110 is part of the demodulator and is after the ADCs 106a, 106b in alternative embodiments the selection circuitry can be provided at any appropriate point in the receiver chain. For example, the selection circuitry can be provided anywhere from the filters or photodiodes or other sensors through to the demodulator(s). The selection circuitry can be used to select and/or apply weightings to the signals thereby to select and/or control the signal(s) on which data extraction is performed.

The selection circuitry according to embodiments can be used to select and/or apply weightings to the signals in any suitable fashion. The selection circuitry may combine the selected signals and the data extraction may be performed on the combined signal. The selection circuitry may select and/or apply weightings either before or after analogue/digital conversion and thus may select and/or apply weightings to the signals either in the analogue or digital domain according to various embodiments.

A skilled person will appreciate that variations of the enclosed arrangement are possible without departing from the invention. Accordingly, the above description of the specific embodiment is made by way of example only and not for the purposes of limitations. It will be clear to the skilled person that minor modifications may be made without significant changes to the operation described.

The invention claimed is:

1. An optical wireless communication system comprising a transmitter apparatus that comprises:
    an illumination light source configured to output visible light for illumination purposes, wherein the illumination light source comprises a dimmable illumination light source, and a controller configured to control operation of the illumination light source to produce modulation of the visible light to provide an optical wireless communication signal representing data;
    a further light source configured to output further light, wherein the controller is configured to control operation of the further light source to produce modulation of the further light to provide a further optical wireless communication signal representing substantially the same data, wherein the visible light and the further light have different wavelengths, and wherein the controller is configured to control an intensity of the further light in dependence on at least one of an intensity level or a dimming level of the visible light.

2. The system according to claim 1, wherein the further light output by the further light source is light that is invisible to the human eye.

3. The system according to claim 2, wherein the further light output by the further light source comprises infrared or ultraviolet light.

4. The system according to claim 1, wherein the controller may control the illumination light source and the further light source such that the illumination light source and the further light source transmit the data at substantially the same time.

5. The system according to claim 1, wherein the illumination light source and the further light source have substantially the same field of view.

6. The system according to claim 1, comprising a luminaire, wherein the illumination light source and the further light source form part of the luminaire.

7. The system according to claim 1, wherein the illumination light source forms part of a luminaire and the further light source forms part of a further component, separate from the luminaire.

8. The system according to claim 1, further comprising a receiver apparatus for receiving the visible light and the further light, wherein the receiver apparatus comprises at least one demodulator for demodulating the optical wireless communication signals from the visible light and the further light.

9. The system according to claim 8, wherein the receiver apparatus comprises at least one sensor for sensing each of the visible light and the further light to produce respective sensor signals, and the receiver apparatus is configured to combine the sensor signals to obtain a combined signal.

10. The system according to claim 8, wherein the receiver apparatus comprises at least one sensor for sending each of the visible light and the further light, and the at least one sensor senses the visible light to produce a first sensor signal and senses the further light to produce a second sensor signal.

11. The system according to claim 10, wherein the receiver apparatus further comprises a selector for selecting one or both of the first and second sensor signals, wherein the receiver apparatus is configured to extract data from the selected signal.

12. The system according to claim 8, wherein the receiver apparatus comprises at least one sensor and the same sensor is used for sensing both the visible light and the further light.

13. The system according to claim 8, wherein the receiver apparatus comprises a filter configured to at least partially block light having at least some wavelengths other than the wavelengths of the visible light and the further light.

14. The system according to claim 1, wherein the controller is configured to provide the modulation of at least one of the visible light or the further light at a modulation frequency between 1 Hz and 10 THz, optionally between 1 kHz and 100 GHz, further optionally between 100 kHz and 10 GHz.

15. An optical wireless communication system comprising a transmitter apparatus that comprises: an illumination light source configured to output visible light for illumination purposes, and a controller configured to control operation of the illumination light source to produce modulation of the visible light to provide an optical wireless communication signal representing data;

a further light source configured to output further light, wherein the controller is configured to control operation of the further light source to produce modulation of the further light to provide a further optical wireless communication signal representing substantially the same data, wherein the visible light and the further light have different wavelengths;

the system further comprising a a receiver apparatus for receiving the visible light and the further light, wherein the receiver apparatus comprises at least one demodulator for demodulating the optical wireless communication signals from the visible light and the further light, the receiver apparatus comprises at least one sensor for sending each of the visible light and the further light, and the at least one sensor senses the visible light to produce a first sensor signal and senses the further light to produce a second sensor signal;

wherein the receiver apparatus further comprises a selector for selecting at least one of the first sensor signal or the second sensor signal, wherein the receiver apparatus is configured to extract data from the selected signal; and wherein the selector is configured to select at least one of the first sensor signal or the second sensor signal based on at least one of: signal strength or, signal to noise ratio.

16. An optical wireless communication system comprising a transmitter apparatus that comprises: an illumination light source configured to output visible light for illumination purposes, and a controller configured to control operation of the illumination light source to produce modulation of the visible light to provide an optical wireless communication signal representing data;

a further light source configured to output further light, wherein the controller is configured to control operation of the further light source to produce modulation of the further light to provide a further optical wireless communication signal representing substantially the same data, wherein the visible light and the further light have different wavelengths;

the system further comprising a a receiver apparatus for receiving the visible light and the further light, wherein the receiver apparatus comprises at least one demodulator for demodulating the optical wireless communication signals from the visible light and the further light, the receiver apparatus comprises at least one sensor for sending each of the visible light and the further light, and the at least one sensor senses the visible light to produce a first sensor signal and senses the further light to produce a second sensor signal;

wherein the receiver apparatus further comprises a selector for selecting at least one of the first sensor signal or the second sensor signal, wherein the receiver apparatus is configured to extract data from the selected signal; and wherein the selector is configured to apply weightings to the first sensor signal and the second sensor signal.

17. The system according to claim 16, wherein the selector is configured to apply weightings to the first sensor signal and the second sensor signal based on at least one of: signal strength or, signal to noise ratio.

18. The system according to claim 16, wherein the selector is configured to apply the weightings in the analogue domain.

19. An optical wireless communication transmitter apparatus that comprises:
- a dimmable illumination light source configured to output visible light for illumination purposes;
- a controller configured to control operation of the dimmable illumination light source to produce modulation of the visible light to provide an optical wireless communication signal representing data; and
- a further light source configured to output further light, wherein the controller is configured to control operation of the further light source to produce modulation of the further light to provide a further optical wireless communication signal representing substantially the same data, wherein
- the visible light and the further light have different wavelengths, and wherein the controller is configured to control an intensity of the further light in dependence on at least one of an intensity level or a dimming level of the visible light.

20. An optical wireless communication receiver apparatus that comprises:
- at least one sensor for sensing received visible light to produce a first sensor signal and received further light to produce a second sensor signal, wherein the visible light and the further light have different wavelengths and are each modulated to provide respective optical wireless communication signals, and the optical wireless communication signals represent substantially the same data;
- a selector for selecting at least one of the first sensor signal or the second sensor signal;
- wherein the selector is configured to select at least one of the first sensor signal or the second sensor signal based on at least one of: signal strength or signal to noise ratio; and
- demodulation circuitry and a processing resource for performing a demodulation and processing with respect to the selected signal to obtain the data.

21. A method of receiving data using optical wireless communication and using the optical wireless communication receiver apparatus of claim 20, the method comprising:
- sensing received visible light to produce a first sensor signal and sensing received further light to produce a second sensor signal,
- wherein the visible light and the further light have different wavelengths and are each modulated to provide respective optical wireless communication signals, and the optical wireless communication signals represent substantially the same data;
- selecting at least one of the first sensor signal and the second sensor signal based on at least one of signal strength or signal to noise ratio and
- performing a demodulation process with respect to the selected signals to obtain the data.

22. A method of transmitting data using optical wireless communication comprising:
- controlling operation of a dimmable illumination light source configured to output visible light for illumination purposes, to produce modulation of the visible light to provide an optical wireless communication signal representing data; and
- controlling operation of a further light source configured to output further light, to produce modulation of the further light to provide a further optical wireless communication signal representing substantially the same data, wherein an intensity of the further light is controlled in dependence on at least one of an intensity level or a dimming level of the visible light, and wherein
- the visible light and the further light have different wavelengths.

* * * * *